Dec. 12, 1939.  E. W. DAVIS  2,183,013
LUBRICATING APPARATUS
Filed Jan. 11, 1937   2 Sheets-Sheet 1

Inventor:
Ernest W. Davis
By Williams, Bradbury, McCaleb & Hinkle
Attys.

Dec. 12, 1939.  E. W. DAVIS  2,183,013
LUBRICATING APPARATUS
Filed Jan. 11, 1937  2 Sheets-Sheet 2
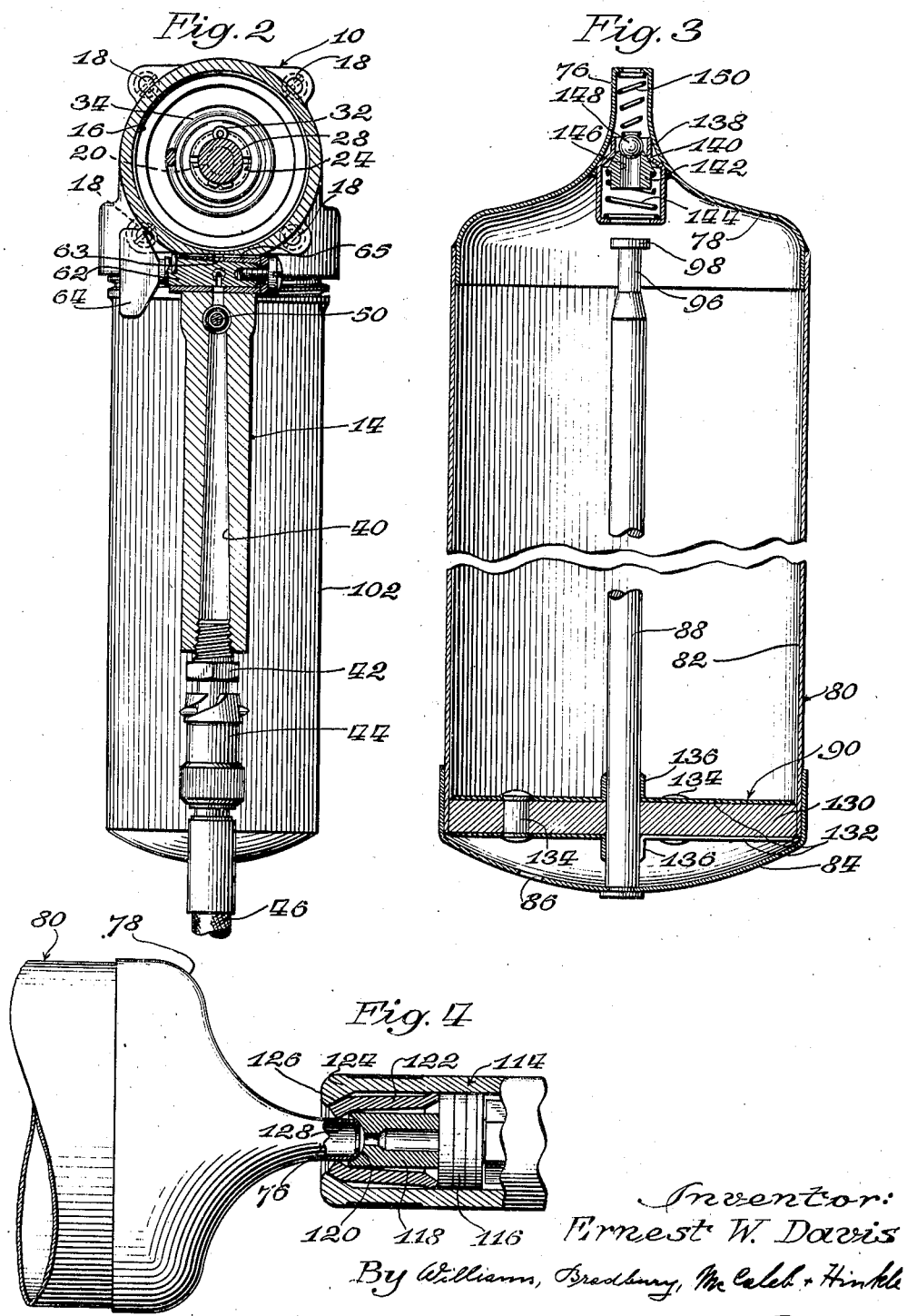

Patented Dec. 12, 1939

2,183,013

UNITED STATES PATENT OFFICE 2,183,013

LUBRICATING APPARATUS

Ernest W. Davis, Oak Park, Ill., assignor to Stewart-Warner Corporation, Chicago, Ill., a corporation of Virginia Application January 11, 1937, Serial No. 119,914

11 Claims. (Cl. 221—47.3)

My invention relates generally to lubricating apparatus, and more particularly to improvements in lubricant compressors of the magazine type, and to lubricant magazines with such compressors.

In the lubrication of machinery, more particularly automobiles, it is desirable to supply various groups of bearings with different kinds of lubricant. For example, the chassis bearings require a certain kind of lubricant, whereas the water pump, the steering gear, wheel bearings, etc., each may require a different kind of lubricant. In relatively small service stations, it is sometimes not feasible to have at hand a lubricant compressor for each kind of lubricant which it is necessary to have available. I have therefore provided a single lubricant compressor which may be used for the servicing of all the bearings, utilizing lubricant containing magazines, one for each of the different lubricants, which may be suitably connected to the compressor and have their contents discharged thereby.

Magazine type compressors of this kind have been proposed and used in the past, but they have not been fully satisfactory in use because of the fact that a certain amount of lubricant of one kind was necessarily retained in the compressor so that upon exchanging magazines to condition the compressor for discharging a different lubricant, a certain amount of the lubricant from the magazine which was removed was retained in the compressor and this residual lubricant was discharged when the compressor was again operated with a second magazine containing a different lubricant. If the compressor was connected to a part designed to receive the lubricant from the second magazine, a certain amount of this residual lubricant from the first magazine was discharged into the part. The amount of residual lubricant from the first magazine was frequently sufficient for the lubrication of several bearings so that it was probable that in the course of lubrication of an automobile, a relatively large proportion of the bearings were supplied with the wrong type of lubricant. While this disadvantageous result might have been obviated by a careful service station attendant by discharging the residual lubricant from previously used magazine into a suitable waste receptacle, this method of using magazine type lubricant compressors was, of course, not very practical because it was wasteful of lubricant, and inconvenient, and therefore unsatisfactory.

With the lubricant compressor and magazines of my invention, the residual lubricant in the compressor is returned to the magazine from which it was taken, the magazine being provided with means for detachably connecting it to the coupler of the lubricant compressor for this purpose.

It is thus an object of my invention to provide an improved magazine type lubricant compressor having magazines which are cooperable with the coupler which forms part of, and is attached to the compressor.

A further object is to provide an improved lubricant magazine for lubricant compressors, and to provide improved means for holding such magazines in the compressors.

Other objects will appear from the following description, reference being had to the accompanying drawings, in which:

Fig. 2 is a sectional view thereof taken on the line 2—2 of Fig. 1;

Fig. 3 is a central, longitudinal, sectional view of a modified form of lubricant magazine; and Fig. 4 is a fragmentary sectional view of the nozzle end of a lubricant magazine shown in cooperation with the coupler attached to the compressor.

Figure 1:
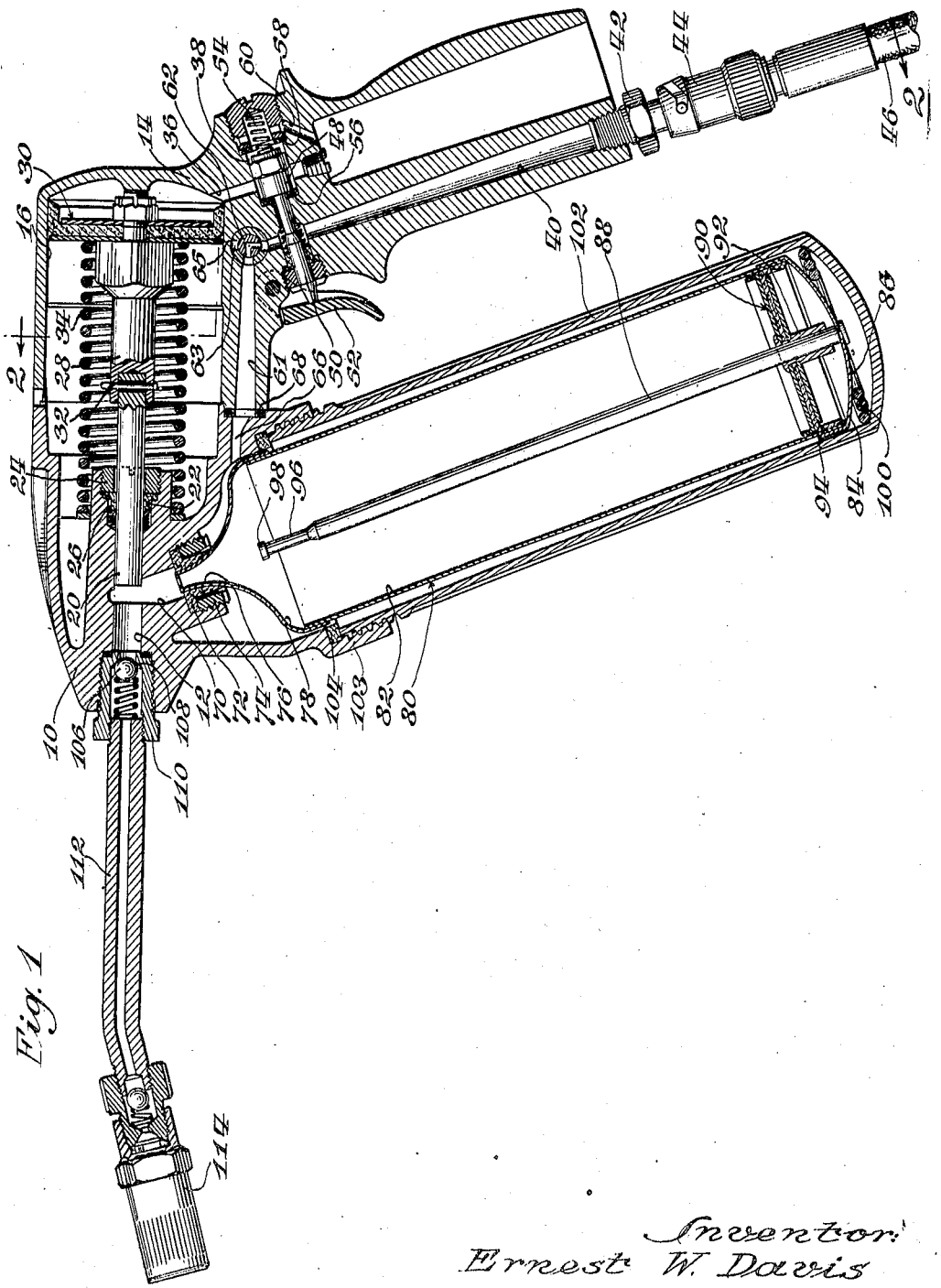
Fig. 1 is a central, vertical, sectional view of a compressed air operated lubricant compressor embodying a magazine and magazine chamber of my invention.

As shown in Fig. 1, the lubricant compressor comprises a body 10, preferably a die casting provided with a high pressure cylinder 12. A handle casting 14 has an air cylinder 16 formed therein, and is secured to the body casting 10 by means of a plurality of cap screws 18 (Fig. 2). A high pressure plunger 20 is reciprocable in the cylinder 12, being sealed therein by a hat washer 22 secured in place by a packing nut 24 and held in sealing engagement with the plunger 20 by a spring pressed gland 26. The plunger 20 is connected to the stem 28 of an air piston 30 by a plug and socket connection and a locking cotter pin 32. A compression coil spring 34 is operable to return the piston 30 which is reciprocable in the cylinder 16.

Air under pressure may be admitted to the cylinder 16 so as to exert pressure against the face of the piston 30, through a passageway 36 which communicates with a valve chamber 38. A passageway 40 formed in the handle casting 14 is arranged to be connected to a suitable source of compressed air or other pressure operating fluid by a fitting 42, coupler 44 and hose 46.

A valve 48 having a suitably packed stem 50 engageable by a trigger 52 controls the flow of air from the passageway 40 to the passageway 36, the valve being resiliently held in closed position by a compression spring 54. The valve 48 is adapted alternately to seat against gaskets 56 and 58 so that when the valve is opened to permit flow of compressed air into the cylinder 16, the valve will engage the gasket 58 and close the port therein by which the valve chamber 38 is normally in communication with the atmosphere by way of a passageway 60.

A rotary plug valve 62 operated by means of a handle 64 (Fig. 2) is arranged to control the supply of compressed air from the passageway 40 to a passageway 64, which in turn communicates with a passageway 66 formed in the body casting 10, a gasket 68 being provided to form a seal at the juncture of these passageways. This valve is provided with a vent passageway 65, communicating with a port 63 to provide means to vent the magazine chamber to the atmosphere when the valve 62 is rotated 90° clockwise from the position in which it is shown in Fig. 1.

An inlet passageway 70 communicates with the high pressure cylinder 12 and is provided at its outer end with a sealing member 72 which is preferably of the hat shaped washer type and may be made of leather or a suitable lubricant resistant rubber composition. The sealing member 72 is held in place by a threaded packing ring 74. The sealing member 72 is conformed to receive the nozzle portion 76 of the tape ring end cap 78 of a lubricant magazine 80.

The magazine 80 includes a cylindrical barrel 82, having an end cap 84 pressed thereon, or otherwise suitably secured thereto. The end cap is provided with a vent aperture 86, and forms a support for a follower guide rod 88 which is riveted thereto. A follower piston 90 secured to a guide sleeve 92 is freely slidable upon the rod 88 and includes a cup leather 94 which makes sealing contact with the wall of the barrel 82. The inner end 96 of the follower guide rod 88 is of reduced diameter and has a head 98 thereon. This reduced diameter portion 96 provides a means for venting the magazine when substantially all of the lubricant has been discharged therefrom, for when the sleeve 92 of the follower reaches the reduced portion 96, a passageway will be formed whereby air may flow through the sleeve 92 into the high pressure cylinder of the compressor and the magazine thereby completely emptied. The operator will notice that the compressor is not delivering lubricant and will thereby be apprised of the necessity of substituting a fully charged magazine for the empty magazine.

The magazine 80 is held with its nozzle 76 in sealing engagement with the sealing member 72 by a conical spiral spring 100 which is compressed between the end cap 84 of the magazine and a magazine chamber or housing 102, which latter is threaded to the body casting, a suitable gasket 104 being provided to seal this connection.

The lubricant discharged from the high pressure cylinder flows past a spring pressed ball check valve 106 which is pressed against a valve seat 108 formed in a valve body 110. A discharge conduit 112 is threaded in the valve body 110 and at its outer end is connected to a coupler 114. The construction of this coupler is illustrated generally in Figs. 1 and 4, and is more fully disclosed in patent to J. Bystricky No. 2,056,249, of October 6, 1936.

This coupler, as shown in Fig. 4, comprises a piston 116 subjected to lubricant pressure from the compressor, the piston bearing against a nozzle 118 provided with a concave spherical contact face 120. A plurality of jaws 122 are positioned between the nozzle 118 and the outer coupler sleeve 124 and are adapted to be pressed forwardly by the piston 116 so as to cause their outer forward ends to be cammed inwardly by a frusto-conical camming surface 126 formed within the outer end of the sleeve 124. The nozzle 76 of the magazine has a substantially cylindrical tip 128 which is of sufficiently small size that it may be inserted in the end of the coupler and have its end face engage the contact face 120 of the nozzle and seal thereagainst. The sides of the cylindrical tip 128 are adapted to be engaged by the jaws 122 when the coupler is being supplied with lubricant under pressure, thereby to provide a mechanical grip upon the magazine nozzle.

The magazine shown in Fig. 3 is of the same general construction as the magazine shown in Figs. 1 and 4, and similar reference characters have therefore been applied to the corresponding parts.

The follower piston 90 shown in the construction of Fig. 3 is composed of a relatively thick disc 130 of cork, or similar material, held between a pair of sheet metal plates 132 which are secured together by rivets 134. The plates 132 are pierced to provide guide flanges 136 engageable with the follower rod 88.

In order to prevent dripping of lubricant from the magazine when it is not being used, a double acting check valve is provided adjacent the outlet. This valve comprises a valve body 138 which is welded, brazed, or otherwise suitably secured within the cap 78 so as to close the opening therein. A seat 140 is formed in the body 138 and is adapted to be engaged by a ported valve member 142 which is held against the seat by a compression coil spring 144. The opening 146 through the valve 142 is normally closed by a ball check valve 148 which is held against the end of the valve 142 by a compression spring 150. The spring 144 is slightly stronger than the spring 150 so that the parts will normally be in the positions in which they are shown in Fig. 3. The valves 142 and 148 seat sufficiently tightly to prevent the escape of lubricant from the magazine when subjected to the gravity head of the lubricant, but open readily under the differential pressures obtained when the magazine is being filled, and when it is being used in the compressor to supply lubricant to the high pressure cylinder thereof.

In using the lubricating apparatus of my invention, a plurality of magazines 80 will be supplied for use with each compressor. These magazines will be filled with the different kinds of lubricants used, and will bear proper identification colors or legends to indicate the kinds of lubricant which they contain. The magazines are, of course, filled by forcing the lubricant into the inlet openings of this nozzle 76 from a suitable source of lubricant under pressure using a coupler 114 or any other suitable means to make the sealed connection with the nozzle 76.

In using the apparatus, assuming that the compressor is connected by means of a coupler 44 and fitting 42 to suitable source of air under pressure, the operator will turn the plug valve 62 clockwise through an angle of 90 degrees (Fig. 1), thereby cutting off the supply of compressed air to the interior of the magazine housing 102 and venting the latter to the atmosphere through port 63 and longitudinal passageway 65. Having relieved pressure within the magazine housing 102, the latter will be unscrewed from the body of the compressor. A hole 103 is preferably provided in the flanged boss into which the magazine housing 102 is threaded, in order to prevent accidents should the operator neglect to cut off the supply of compressed air to the magazine housing before starting to unscrew the housing from the compressor. As soon as the housing 102 is unscrewed sufficiently to break the seal between it and the gasket 104, air will rush through the hole 103 and by the noise of its escape apprise the operator of his neglect in failing to close the valve 62.

After unscrewing and removing the magazine housing 102, a magazine filled with the desired lubricant is inserted with its nozzle 76 in engagement with the sealing member 72. The magazine housing 102 is then replaced being secured tightly against the gasket 104 so as to form an airtight seal therewith. Thereafter the valve 62 is turned to the position in which it is shown in Fig. 1, admitting air under pressure to the interior of the magazine chamber 102. This pressure will be communicated through the hole 86 in the end cap 48 of the magazine and exert pressure upon the follower piston 90, thereby discharging lubricant from the magazine through the passageway 70 into the high pressure cylinder 12. The air pressure will normally be insufficient to force the lubricant past the outlet check valve 106.

Having thus primed the high pressure cylinder, the compressor will be in condition for use, and after connecting the coupler with a fitting attached to the part to be lubricated, the operator will press the trigger 52, thus opening the valve 48 and permitting flow of air under pressure into the air motor cylinder 16. This air pressure acting on the piston 30 will move the latter, together with the high pressure plunger, to the left, (Fig. 1) against the force of the spring 34. At the same time, the valve 60 will seal against the seat 58 and cut off the communication of the valve chamber 38 with the atmosphere. After the plunger 20 has reached the end of its stroke, the operator will release the trigger 52, whereupon the valve 48 will be moved by its spring 54 to the position in which it is shown in Fig. 1. The valve chamber 38 and cylinder 16 will thus be cut off from the supply of compressed air and connected to the atmosphere through the passageway 60. As the pressure within the cylinder 16 of the air motor drops to atmospheric, the spring 34 will return the air piston 30 to its normal position shown in Fig. 1, whereupon the compressor will have completed a cycle of operation.

When the operator finds it necessary to use a lubricant different from that contained in the magazine in the compressor, he will turn the valve 62 to cut off the supply of air pressure to the magazine chamber, and replace the magazine therein with a magazine containing the desired lubricant. Under these circumstances, however, the passageway 70, the high pressure cylinder 12, and the passageway through the discharge conduit 112 and the interior of the coupler 114 will be filled with the kind of lubricant previously used, and which the operator no longer desires to use. To prevent the wastage of this lubricant or to make it unnecessary for the operator to use up this lubricant upon a bearing which requires a different type of lubricant, the operator will connect the magazine which he has removed from the compressor to the coupler 114 thereof in the manner illustrated in Fig. 4, and operate the compressor a predetermined number of times sufficient to clear the compressor and coupler of all of that type of lubricant which corresponds to that in the magazine into which it is being discharged.

The operator will find after brief experimentation that by operating the compressor a certain number of times, lubricant discharge passageways of the compressor and coupler may be readily cleared of the previously used lubricant and filled with the new lubricant. In this way, the compressor may be easily conditioned to supply each group of bearings with the particular kind of lubricant best suited for its requirements, and without wasting lubricant by intermixing the various kinds, or merely discharging the lubricant of the unwanted kind into a waste receptacle.

When magazines of the type shown in Fig. 1 are used in hot climates, some lubricants will not retain their body, but will permit the oil to separate from the soaps and this oil may leak from the nozzle of the magazine unless the magazine is stored with the nozzle pointing upwardly. To prevent the possibility of such dripping and leakage of the lubricant from the magazines, a magazine having the construction illustrated in Fig. 3 may be employed. It will be readily understood that when magazines of this type are used in the lubricant compressor, the pressure on the lubricant resultant from the air pressure within the magazine housing will be sufficient to cause flow of the lubricant past the check valve 148, and likewise when the magazine is being charged with lubricant, the valve 142 will unseat readily to permit the admission of lubricant to the barrel of the magazine. These valves 148, 142 do, however, seat sufficiently tightly to prevent the escape of lubricant under the gravity head of the lubricant, and similarly prevent the admission of air to the barrel of the magazine, as might otherwise occur due to the weight of the lubricant when the magazine is stored with its nozzle pointing upwardly.

While I have shown and described particular embodiments of my invention, it will be apparent to those skilled in the art that the invention may be embodied in numerous other forms which are the equivalent or substitutes for the constructions disclosed. I therefore desire to include within the scope of the following claims, all such constructions by which substantially the results of my invention may be secured in substantially the same way.

I claim:

1. In a manually controlled lubricant compressor having a coupler for detachably connecting the compressor to a part to be lubricated, the combination of a lubricant magazine having a nozzle and a movable wall, sealing means in said compressor for receiving said nozzle, means detachably enclosing said magazine in an air-tight chamber, means for admitting air under pressure to said chamber independently of the control of said compressor for driving said wall to discharge lubricant through said nozzle into said compressor, said nozzle being conformed to establish an air-tight sealed connection with said sealing means when supplying lubricant to said compressor, and to establish a lubricant-tight sealed connection with said coupler when said compressor is being operated independently of said air-admitting means to return to said magazine and clear said compressor and coupler of lubricant therein which was supplied to the compressor and coupler by said magazine.

2. In lubricating apparatus of the class described, the combination of a lubricant compressor having a pumping mechanism and a discharge conduit terminating in a coupler, and a lubricant magazine having means for detachably connecting it to said compressor to supply lubricant to said pumping mechanism and having a nozzle part cooperable with said coupler to receive lubricant from said pumping mechanism.

3. In a manually controlled lubricant compressor having a coupler for detachably connecting the compressor to a part to be lubricated, the combination of a lubricant magazine having a nozzle and a movable wall, sealing means in said compressor for receiving said nozzle, means independently enclosing said magazine in an air-tight chamber, a three-way valve operable alternately to admit air under pressure to said chamber and to vent said chamber to the atmosphere independently of the control of said compressor for forcing lubricant from said magazine into said compressor, said nozzle being conformed to establish an air-tight sealed connection with said sealing means when said three-way valve is set to admit air under pressure to said chamber and to establish a lubricant-tight sealing connection with said coupler when said three-way valve is set to vent said chamber to atmosphere to return said magazine and clear said compressor and coupler of lubricant therein which was supplied to the compressor and coupler by said magazine.

4. In a lubricating apparatus of the class described, the combination of a lubricant compressor having a discharge conduit terminating in a coupler, and a lubricant magazine having means for detachably connecting it to said compressor to supply lubricant thereto and for detachably connecting it to said coupler to receive lubricant from said compressor.

5. An interchangeable lubricant magazine for lubricant compressors comprising a cylindrical lubricant reservoir, a follower reciprocable in said reservoir, an outlet nozzle at one end of said reservoir, and a two-way spring-pressed check valve in said outlet nozzle.

6. A lubricant magazine for lubricant compressors comprising a cylindrical reservoir, a follower reciprocable in said reservoir, a cap having an aperture therein at one end of said reservoir, a filling and discharge nozzle at the other end of said reservoir and integral therewith, and a pair of spring pressed check valves in said nozzle, said valves opening in opposite directions and so constructed as to prevent admission of lubricant to and discharge of lubricant from said nozzle except when the lubricant is subjected to appreciable pressure.

7. A lubricant magazine for lubricant compressors comprising a cylindrical reservoir, a follower reciprocable in said reservoir, a cap having an aperture therein at one end of said reservoir, a filling and discharge nozzle at the other end of said reservoir integral therewith, and a pair of spring-pressed check valves in said nozzle, one of said valves being apertured and forming a seat for the other, and said valves opening in opposite directions.

8. A lubricant magazine for lubricant compressors, comprising a barrel, an apertured cap closing one end of said barrel, a follower guide rod secured to said cap, a follower piston slidable on said rod, a nozzle cap secured to the other end of said barrel, a discharge and filling nozzle formed integrally with said nozzle cap, and means within said nozzle to prevent the passage of lubricant therethrough in either direction under low pressure and permitting passage of lubricant therethrough in either direction under high pressure.

9. In a high pressure lubricant compressor having a high pressure cylinder, a plunger reciprocable therein, and means for reciprocating said plunger, the combination of a sealing member at the inlet end of said cylinder defining a tapering passageway leading to said cylinder, a magazine having a protruding nozzle receivable in said passageway and engageable with said sealing member to make an air-tight connection therewith, thereby to prevent air under pressure around said magazine from entering said tapered passageway, an air-tight magazine housing surrounding said magazine, a spring compressed between said housing and said magazine to hold said magazine against said sealing member, and means to admit air under pressure to said housing and to said magazine to force lubricant from the magazine into said high pressure cylinder.

10. In a high pressure lubricant compressor, the combination of a high pressure cylinder, a plunger reciprocable therein, means for reciprocating said plunger, and means to supply lubricant to said high pressure cylinder comprising a sealing member at the inlet of said cylinder, a magazine having a protruding nozzle engageable within said sealing member to make an air-tight connection therewith, said nozzle extending through said sealing member and emptying directly into said inlet, an air-tight magazine housing surrounding said magazine, and means to admit air under pressure to said housing and to said magazine to force lubricant from the magazine into said high pressure cylinder.

11. A high pressure cylinder with an inlet and an outlet opening and a coupler connected to said outlet opening, the combination of a detachable magazine having a nozzle conformed to engage interchangeably with said coupler in lubricant receiving relationship and to engage said inlet in lubricant discharging relationship, means for detachably securing said magazine relative to said inlet, and means for forcing lubricant from said magazine when said magazine is in engagement with said inlet.

ERNEST W. DAVIS.